United States Patent
Horst et al.

(10) Patent No.: US 10,083,330 B2
(45) Date of Patent: Sep. 25, 2018

(54) METHOD AND RFID WRITER-READER FOR SELECTING AN RFID DATA CARRIER

(71) Applicant: Siemens Aktiengesellschaft, Munich (DE)

(72) Inventors: Dieter Horst, Cadolzburg (DE); Markus Weinländer, Happurg (DE)

(73) Assignee: Siemens Aktiengesellschaft, Munchen (DE)

( * ) Notice: Subject to any disclaimer, the term of this patent is extended or adjusted under 35 U.S.C. 154(b) by 0 days.

(21) Appl. No.: 14/612,929

(22) Filed: Feb. 3, 2015

(65) Prior Publication Data
US 2015/0227769 A1  Aug. 13, 2015

(30) Foreign Application Priority Data
Feb. 7, 2014  (EP) ..................................... 14154305

(51) Int. Cl.
*G06K 19/00* (2006.01)
*G06K 7/10* (2006.01)

(52) U.S. Cl.
CPC ..... *G06K 7/10198* (2013.01); *G06K 7/10019* (2013.01); *G06K 7/10128* (2013.01); *G06K 7/10366* (2013.01)

(58) Field of Classification Search
USPC .......... 235/435, 439, 451, 487, 492; 340/10, 340/572
See application file for complete search history.

(56) References Cited

U.S. PATENT DOCUMENTS

| | | | |
|---|---|---|---|
| 2007/0046433 A1* | 3/2007 | Mukherjee | G06K 19/0672 340/10.1 |
| 2010/0060423 A1* | 3/2010 | Pillai | H04Q 9/00 340/10.1 |
| 2012/0139774 A1* | 6/2012 | Nagy | G01S 11/10 342/128 |
| 2013/0049937 A1 | 2/2013 | Horst et al. | |
| 2013/0069829 A1 | 3/2013 | Smely et al. | |

FOREIGN PATENT DOCUMENTS

| | | |
|---|---|---|
| CN | 102540173 | 7/2012 |
| CN | 103077411 | 5/2013 |
| DE | 10 2011 100910 | 11/2012 |

OTHER PUBLICATIONS

Office Action dated Apr. 25, 2017 which issued in the corresponding Chinese Patent Application No. 201510066796.5.

* cited by examiner

Primary Examiner — Matthew Mikels
(74) Attorney, Agent, or Firm — Cozen O'Connor (57) ABSTRACT

A method and RFID writer-reader for selecting a RFID data carrier from a plurality of RFID data carriers detected by an RFID writer-reader, wherein the RFID data carrier of the RFID data carriers detected in productive operation is selected based on the respective degree of correspondence between sequences of actual values determined in productive operation that are compared with at least one sequence of setpoint values so as to reliably select a desired RFID data carrier even in difficult reception situations.

16 Claims, 4 Drawing Sheets

METHOD AND RFID WRITER-READER FOR SELECTING AN RFID DATA CARRIER

BACKGROUND OF THE INVENTION

1. Field of the Invention

The invention relates to a Radio Frequency Identification (RFID) writer-reader and a method for selecting an RFID data carrier from a number of RFID data carriers detected by the RFID writer-reader.

2. Description of the Related Art

For identifying workpieces and other objects, Radio Frequency Identification (RFID) data carriers ("transponders" or "TAGs") and the associated RFID writer-readers ("readers") are used particularly in industrial automation arrangements. Passive RFID data carriers are usually used, which are supplied with energy from a radio-frequency field generated by the RFID writer-reader and which transmit information to the RFID writer-reader by modulation ("backscattering") of the radio-frequency field. The RFID writer-reader therefore has to simultaneously both transmit, and receive the modulated signal where, despite the fact that the received signal is based on the radio-frequency signal emitted by the RFID writer-reader, the received signal component can be regarded as emitted by the RFID data carrier.

Particularly in the case of RFID systems that operate in the Ultra-High Frequency (UHF) range, a plurality of RFID data carriers can be detected by the RFID writer-reader simultaneously. Although this is actually desired for many applications, such as for detecting all goods in a basket of goods, in many applications it is desirable for only a single RFID data carrier to be detected, to be precise regularly the one closest to the RFID writer-reader. If nevertheless a plurality of RFID data carriers are detected simultaneously in such arrangements, after detection an attempt must be made to select, i.e., filter out, the closest of the RFID data carriers.

Numerous procedures for performing such a selection are known in the prior art. By way of example, the received field strength Received Signal Strength Indication (RSSI) is registered for all received RFID data carriers, where it is assumed that that RFID data carrier having the best received field strength is also the closest, and so it is selected. On account of reflections of the radio waves, overshoots and other effects, however, it is possible that the closest of the RFID data carriers is not actually also the one that is received with the best signal strength. Besides optimizations in the radio field, for example by electromagnetic shielding of adjacent regions and the like, an attempt is often made to filter out the incorrectly selected RFID data carriers, i.e., "false positive reads", by a corresponding processing logic, such as by comparison of the serial numbers (transponder ID) with expected values. However, accurate knowledge of the expected values is required for this purpose, and so a downstream processing logic is not always able to filter out the transponders which, although technically correctly detected, nevertheless are not currently associated with the actual reading task.

Further methods for selecting the transponder consist, for example, in dynamically adapting the transmission power of the RFID writer-reader, such as by progressively increasing the transmission power proceeding from a minimal value until exactly one RFID data carrier is detected; this method is also known as "power ramping". Another method consists in starting a multiplicity of successive detection processes, that RFID data carrier which is detected most often then being selected, for example. This procedure can, if appropriate, also be combined with the "power ramping" method described above.

SUMMARY OF THE INVENTION

Although the measures described above which, if appropriate, can also all be combined with one another, are able to considerably reduce the number of false selections (false positive reads), nevertheless it is an object of the invention to further improve the reliability in the selection of RFID data carriers.

This and other objects and advantages are achieved by providing a method in which a number of the RFID data carriers ("population") situated in the reception region of an RFID writer-reader are registered via a multiplicity of detection processes to be performed successively, where a reception parameter (such as the received field strength) is intended to be detected in each case. For each of the detected RFID data carriers, which can be distinguished from one another generally based on their serial number or other properties, the signal profile registered here is logged, such as in the manner of a profile curve (graph). After a training phase (calibration), in which it is known which of the RFID data carriers and thus also which of the detected graphs is the one that is desired and is thus to be selected, the associated graph or a characteristic variable ascertained therefrom is stored as setpoint value and thus as a specimen (template). During subsequent detection processes in productive operation, the signal profiles of the RFID data carriers detected here are likewise considered as profile curve (graph), where that one of the RFID data carriers whose profile curve (graph) or a characteristic variable likewise calculated therefrom has the greatest similarity to the specimen (template) is intended to be selected in accordance with the invention. This ensures that individual measurements which, on account of external circumstances, disturbances or random occurrences, may cause a remote RFID data carrier to undesirably appear to be the one to be selected do not lead to a "false positive read".

In this case, the method in accordance with the invention selects an RFID data carrier from a number of RFID data carriers detected by an RFID writer-reader, where during a training phase a setpoint value for a reception parameter of a specimen RFID data carrier to be selected is determined, and where during productive operation actual values of reception parameters of detected RFID data carriers are related to the setpoint value for the selection of one of the detected RFID data carriers. Here, during the training phase in a first temporal sequence a number of detections of at least one specimen RFID data carrier are performed, where at least one sequence of setpoint values for at least one reception parameter is determined in the manner of a temporal profile curve, where a number of detections of the RFID data carriers situated in the reception region of the RFID writer-reader are performed during productive operation in a second temporal sequence, where in each case a sequence of actual values is determined in the manner of a temporal profile curve for each of the RFID data carriers detected here, where the sequences of actual values determined in productive operation are compared in each case with the at least one sequence of setpoint values, and where one of the RFID data carriers detected in productive operation is selected based on the respective degree of correspondence. This method ensures a reliable selection of the RFID data carrier even in such cases in which, as a result of overshoots and other effects, RFID data carriers that are not desired RFID data carriers, are detected at least temporarily with a better reception parameter.

It is also an object to provide an RFID writer-reader for selecting an RFID data carrier from a number of detected RFID data carriers, where the RFID writer-reader is configured such that a setpoint value for a reception parameter of a specimen RFID data carrier to be selected is determined during a training phase, and where actual values of reception parameters of detected RFID data carriers are related to the setpoint value for the selection of one of the detected RFID data carriers during productive operation. Here, the RFID writer-reader is configured such that a number of detections of at least one specimen RFID data carrier are performed during the training phase in a first temporal sequence, where at least one sequence of setpoint values for at least one reception parameter is determined in the manner of a temporal profile curve, where a number of detections of the RFID data carriers situated in the reception region of the RFID writer-reader are performed during productive operation in a second temporal sequence, where in each case a sequence of actual values is determined in the manner of a temporal profile curve for each of the RFID data carriers detected here, where the sequences of actual values determined in productive operation are compared in each case with the at least one sequence of setpoint values, where one of the RFID data carriers detected in productive operation is selected based on the respective degree of correspondence. The advantages already discussed with reference to the method can be realized via such an RFID writer-reader.

Advantageously, a field strength value, a signal-to-noise ratio or some other qualitative criterion of the radio-frequency signal of the respective RFID data carrier, where each signal is detected by the RFID writer-reader, can be used as the reception parameter to be evaluated. These reception parameters are present anyway in the conventional RFID writer-readers, and so these values merely have to be recorded. In addition, the phase angle between transmitted signal and received signal can also advantageously be used as a reception parameter, which is advantageous particularly for filtering out reflections. It should be understood that a plurality of different reception parameters can also be detected for one and the same RFID data carrier, thus resulting in a plurality of sequences of setpoint values and actual values, where a possibly weighted total value can be calculated from the respective comparisons of the resulting curves.

Even in a steady-state situation, in which there is no variation of either the distance between the RFID writer-reader and the respective RFID data carriers or the transmission power or other transmission parameters of the RFID writer-reader, the values for the reception parameter measured during the sequence of detection processes are in no way constant, and so a profile curve can already be determined here. However, significantly better results can be achieved if the transmission power of the RFID writer-reader is varied in each case during the temporal sequence, such as in the manner of an ascending ramp ("power ramping") or, in an alternative embodiment, for example, in a nonlinear manner, such as sinusoidally or exponentially. Alternatively or additionally, the distance between the respective RFID data carrier and the RFID writer-reader in each case also can be varied as a variation. This embodiment is appropriate, in particular, in such cases in which the RFID data carriers or the objects identified thereby are moved anyway, such as via a conveyer belt. In all cases, it holds true, however, that the variation during the training phase and the variation during productive operation are advantageously intended to be effected in a manner analogous to one another. Otherwise, however, it is also appropriate to correspondingly scale at least one of the two profile curves with regards to the time axis, in order to ensure the comparability of the curve-type profiles detected. A further means for variation is possible, provided that the RFID writer-reader has a number of switchable antennas and/or switchable antenna polarizations (e.g. horizontal, vertical or circular). In that case, as an alternative or in addition to the measures described above, during the recording of the temporal sequence, the antennas and/or antenna polarizations can be switched, if appropriate also multiply during a detection cycle. Furthermore, a variation between a plurality of available radio channels of the RFID writer-reader is also appropriate, which is advantageous particularly if the radio channels lie in different frequency bands. As a result, it is possible, for example, to detect even those of the RFID data carriers which, at a specific frequency, owing to interference caused by reflection, are situated at a location at which detection is not possible.

Advantageously, during the training phase a plurality of sequences of setpoint values are detected, where at least one of the sequences is selected by a user as the sequence of setpoint values to be used. For this purpose, it may suffice, for example, to specify a serial number or some other identification feature of one of the RFID data carriers detected here. Alternatively, the differentiation can also take place automatically, such as based on information read from a data field of the RFID data carrier, or based on a serial number. In this regard, by way of example, based on a "prefix" or "number band" of the identification number, it is possible to distinguish between functional groups of RFID data carriers, where the RFID data carrier that belongs to the associated group for the substantive application is then used as specimen. Consequently, during the training phase it is then already possible to distinguish between the "specimen transponder" and possible non-desired transponders received simultaneously. However, the proposed measure can also serve, in the case of repeated detection of the specimen RFID transponder, to select a particularly suitable one of the resulting profile curves. Furthermore, it is possible to allow a particularly suitable setpoint value curve to be determined or calculated automatically from a plurality of profile curves of the same specimen RFID transponder. On the one hand, this can be achieved by averaging or some other combination of the setpoint value curves determined. On the other hand, the RFID writer-reader or some other computer unit can also select as the "template" that setpoint value curve having the best correspondence to all the other detected setpoint value curves (sequence of setpoint values of the specimen RFID data carrier). Moreover, it can be advantageous also to use a plurality of different specimen RFID transponders in the case of the detection of a plurality of setpoint value curves, particularly if different types of RFID data carriers are intended to be used in the application scenario. If appropriate, a plurality of templates are then used in productive operation.

For the comparison of sequences of setpoint values and actual values, a characteristic variable or a characteristic variable data set can be initially created from each of the curves. Only the characteristic variables or the characteristic variable data sets then need be compared for the comparison of the curves. What is of significance in this case, of course, is not an absolute correspondence, but rather the best possible or highest correspondence. With the use of characteristic variable data sets, here the individual parameters of the respective data sets do not necessarily have to correspond in the same way, rather weightings can be performed. Processing by a neural network and/or in according with fuzzy logic rules is also appropriate here. Particularly suitable ways for determining the characteristic variables include, for example, Fourier transformation or, in relation to the fact that discrete value pairs are involved here, fast Fourier transformation (FFT). It should be understood that other methods for evaluating an analog or digital (time-discrete) signal profile can also be used.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the method in accordance with the invention is explained below with reference to the drawings. It serves at the same time to elucidate an RFID writer-reader in accordance with the invention, in which.

DETAILED DESCRIPTION OF THE EXEMPLARY EMBODIMENTS

Figure 1:
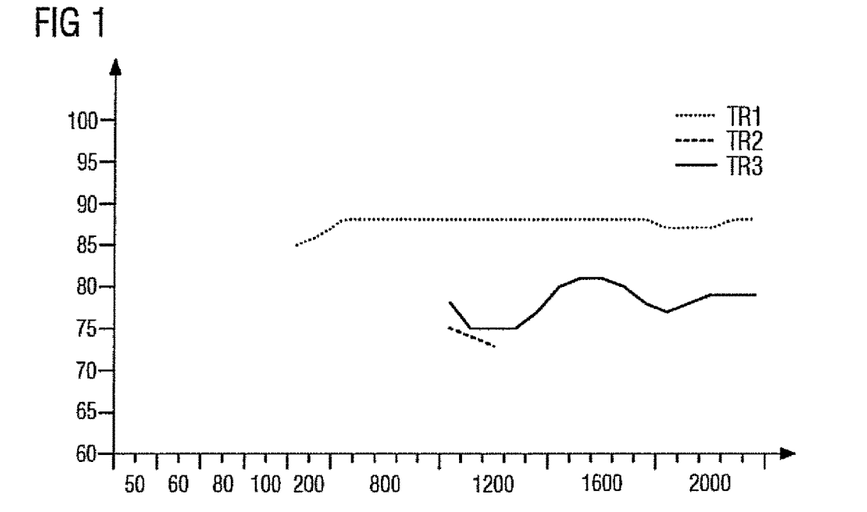
FIG. 1 shows graphical plots of the temporal profile curves in the case of the detection of three RFID data carriers in a first measurement in accordance with the invention.

FIG. 1 is a graphical plot of a profile curve values of a reception parameter in the case of a number of detections of three different RFID data carriers TR1, TR2, TR3. Here, a value for the transmission power of the RFID writer-reader is represented on the abscissa of the illustration. It can be seen that in each case a plurality of successive measurements with constant transmission power were performed. Consequently, the transmission power has therefore assumed a stepped profile. The profile curves for the considered reception parameter of the RFID data carriers TR1, TR2, TR3 are illustrated as solid line, dotted line and dashed line in the illustration; FIG. 1 actually does not make any statement about how many detections actually occurred. However, it can be assumed that at least one detection process occurred for each of the values for the transmission power plotted on the abscissa.

Here, a reception parameter, for example, the received field strength received signal strength indication (RSSI) is plotted on the ordinate of the illustration in FIG. 1. The absolute values entered on the abscissa and on the ordinate have been scaled, which means that the actual transmission powers and received field strengths may deviate with regards to their absolute values. Therefore, only a qualitative profile is indicated in the illustration.

It should be assumed that the illustration in FIG. 1 involved the situation during the training phase, where it should furthermore be assumed that the RFID data carrier TR1 is the specimen RFID data carrier. The values for the evaluated reception parameter (here: RSSI value) thereof are higher than the corresponding reception parameter of the RFID data carriers TR2, TR3 during the complete temporal profile considered. This means that the situation from FIG. 1 could already have been controlled with the means known from the prior art. It should be assumed that the profile of the reception parameter of the RFID data carrier TR1 recorded here is intended to be used as a sequence of setpoint values (setpoint value curve) during productive operation.

Figure 2:
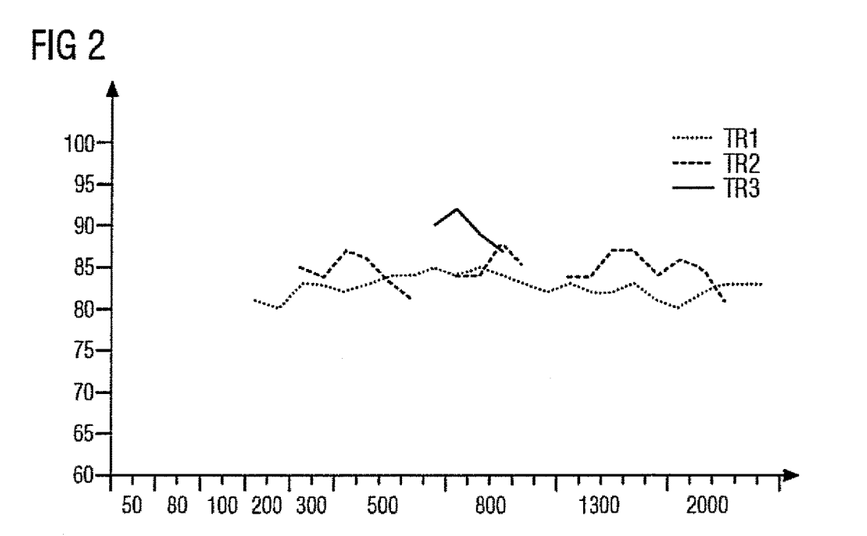
FIG. 2 shows a graphical plot of the temporal profile in a second measurement in accordance with the invention.
Figure 3:
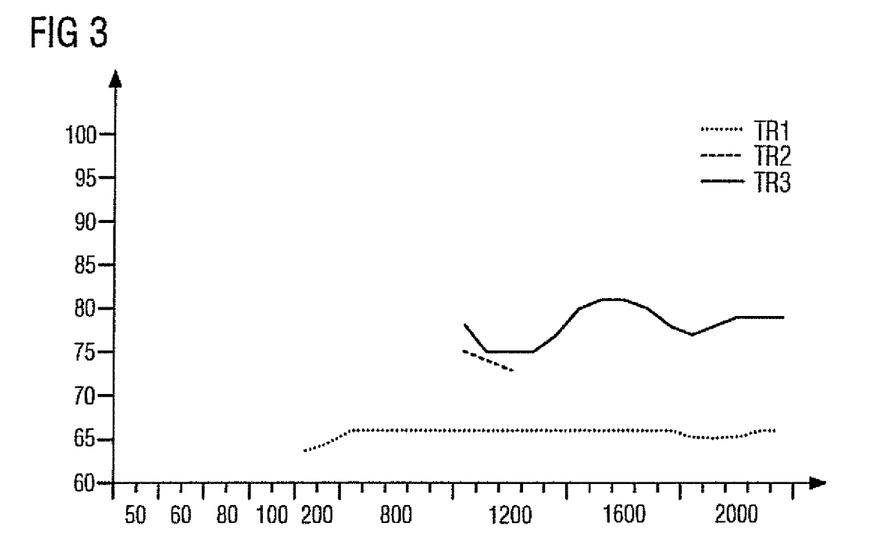
FIG. 3 shows the temporal profile in a third measurement in accordance with the invention.

The same scenario is then considered in FIGS. 2 and 3, where the actual values for two different measurement cycles (detection cycles) in productive operation are entered in FIGS. 2 and 3. The RFID data carriers TR1, TR2, TR3 recorded in FIGS. 2 and 3 are not necessarily the same ones that were also used in the training phase.

The situation from FIG. 2 will be considered first. In a manner analogous to the training phase, here the temporal profile of a reception parameter of the RFID data carriers TR1, TR2, TR3 has in each case been represented graphically. In contrast to the situation from FIG. 1, in which the RFID data carrier to be selected from the RFID data carriers TR1, TR2, TR3 could have been ascertained solely via a comparative consideration of the average value or the maximum value of the reception parameter, the situation in FIG. 2 is less clear.

A consideration of the (average) amplitude of the signal profile here does not lead to the aim, therefore, which consists in automatically selecting the "correct" one of the RFID data carriers, i.e., the RFID data carrier TR1.

It can be seen in FIG. 1 that that curve which is to be assigned to the RFID data carrier TR1 has a comparatively smooth "profile", which after a Fourier transformation, for example, has the result that in the case of this curve profile only few high-frequency signal components result, but in contrast a very high constant component ("DC voltage component"). This means, therefore, that a characteristic variable resulting from the setpoint value curve of the RFID data carrier TR1 could state that a high proportion of low signal frequencies and a small proportion of high signal frequencies should be assumed as characteristic of the RFID data carrier to be selected. As soon as this information is applied to the three signal profiles illustrated in FIG. 2, it can be assumed that here, too, the characteristic variables of the RFID data carrier TR1 have the smallest high-frequency component, because the profile curves of the RFID data carriers TR2 and TR3 in each case have jumps that would lead to a pronounced high-frequency component in the frequency spectrum. Therefore, the RFID data carrier TR1 would be selected correctly here, even though the RFID data carrier TR3, for example, exhibits the highest absolute values for the reception parameter considered.

The situation illustrated in FIG. 3 is even clearer. Although here the RFID data carrier TR1 is received with the lowest received field strength over the entire measured profile, its profile curve has the highest similarity to the setpoint value curve (see FIG. 1, RFID data carrier TR1). A method oriented only to the absolute values for the reception parameter determined, such as based on averaging, would arrive here at the incorrect result that the RFID data carrier TR3 should be selected.

The degree of correspondence determined upon comparison of the profile curves can be used, as described, in the case of a plurality of RFID data carriers detected simultaneously, to select the one having the highest degree of correspondence with regard to its profile curve for the reception parameter, where the profile curve is determined in productive operation. Moreover, particularly (but not only) in the cases in which only one RFID data carrier is detected in productive operation, it is possible to predefine a minimum degree of correspondence between setpoint value curve and actual value curve. Thus, incorrect detections on account of overshoots can be filtered out and, equally, defective RFID data carriers can also be identified.

The method and RFID writer-reader in accordance with the contemplated embodiments of the invention, make it is possible to assess the dynamic profile of a reception parameter, in particular of the RSSI-value, instead of the hitherto customary evaluation of statistical values. Consequently, the change in a value of the reception parameter considered across the temporal profile can be used as an essential characteristic for the selection of an RFID data carrier. Here, in accordance with the invention, the selection or the rejection of RFID data carriers is intended to occur based on a specimen comparison between a reference curve and an actual value curve. The Fourier transformation used in the present exemplary embodiment and the differentiation of low-frequency and high-frequency signal components that is realized thereby should be regarded here merely as one exemplary example of an analysis of the dynamic profile. The prior art discloses a multiplicity of methods of characteristic value formation for the dynamic profile of an event which, in accordance with the invention, can also be used in combination with one another to compare a setpoint value curve with the actual value curves and in each case to indicate a measure of the similarity between two curves.

Figure 4:
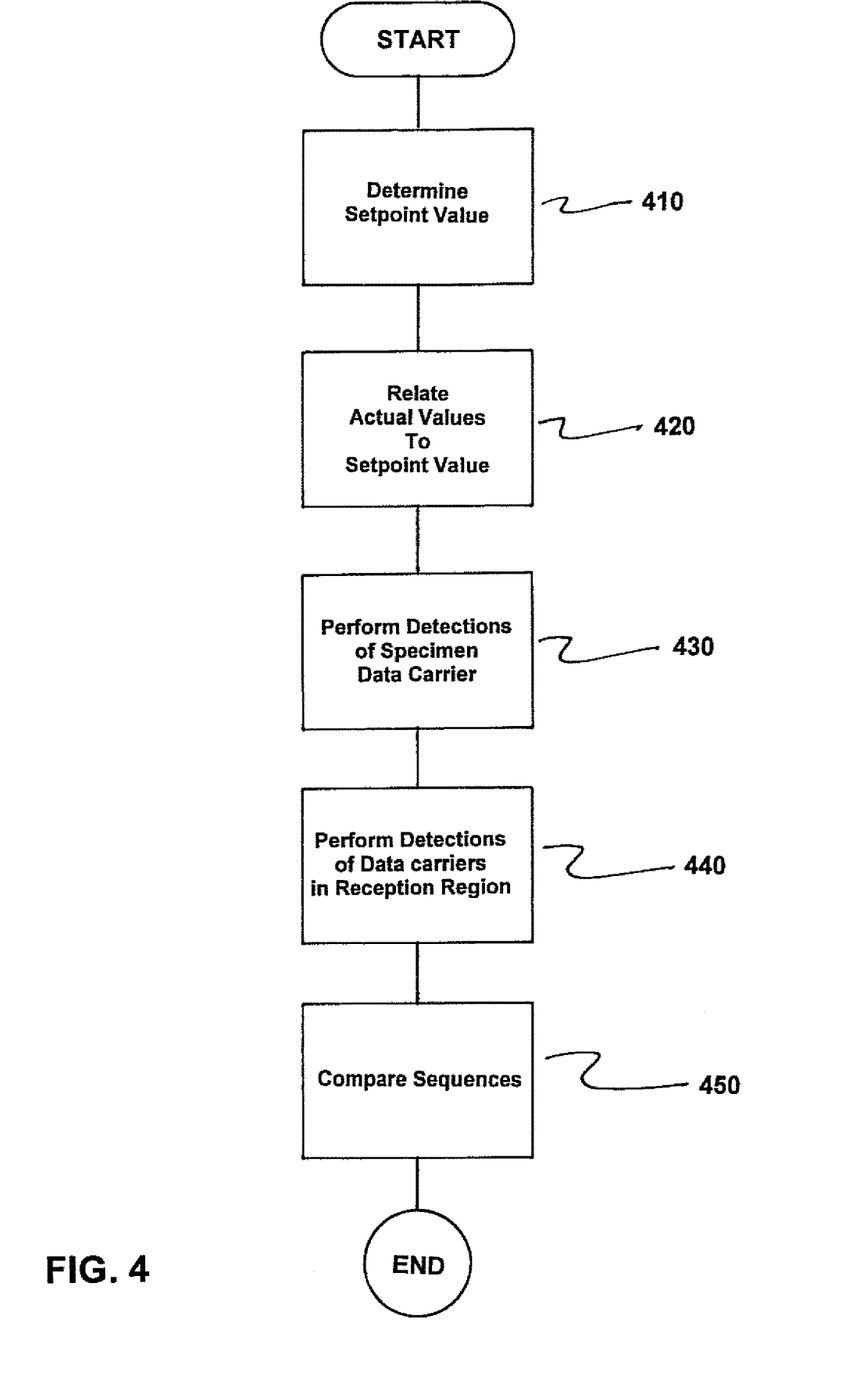
FIG. 4 is a flowchart of the method in accordance with the invention.

FIG. 4 is a flowchart of a method for selecting a radio frequency identification (RFID) data carrier from a plurality of radio frequency identification (RFID) data carriers (TR1, TR2, TR3) detected by an RFID writer-reader.

The method comprises determining a setpoint value for a reception parameter of at least one specimen RFID data carrier (TR1, TR2, TR3) to be selected during a training phase, as indicated in step 410.

Next, actual values of reception parameters of detected RFID data carriers (TR1, TR2, TR3) are related to the setpoint value for selecting the RFID data carrier from the detected RFID data carriers (TR1, TR2, TR3) during productive operation, as indicated in step 420.

Detections of the at least one specimen RFID data carrier (TR1) are then performed during the training phase in a first temporal sequence, as indicated in step 430. Here, at least one sequence of setpoint values for at least one reception parameter is determined as a temporal profile curve.

Detections of RFID data carriers (TR1, TR2, TR3) situated in the reception region of the RFID writer-reader are now performed during productive operation in a second temporal sequence, as indicated in step 440. In this case, a sequence of actual values is determined as a temporal profile curve for each of the detected RFID data carriers (TR1, TR2, TR3).

Next, each sequence of the sequences of actual values determined in productive operation is compared with the at least one sequence of setpoint values, as indicated in step 450. Here, the RFID data carrier of the RFID data carriers (TR1, TR2, TR3) detected in productive operation are thus selected based on a respective degree of correspondence.

Figure 5:
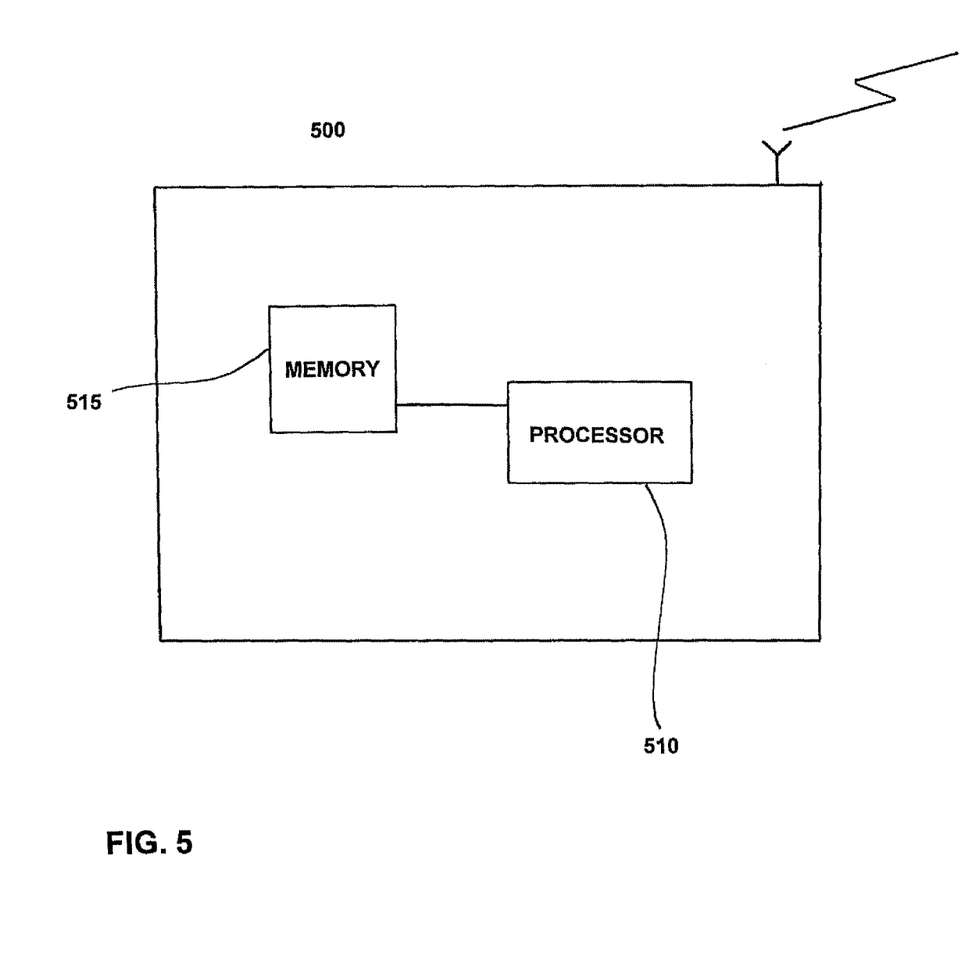
FIG. 5 is a schematic block diagram of an RFID writer-reader in accordance with the invention.

FIG. 5 is a schematic block diagram of an RFID writer-reader 500 for selecting an RFID data carrier from a plurality of detected RFID data carriers (TR1, TR2, TR3) in accordance with the invention. The RFID writer-reader 500 includes a processor 510 and memory 515, where the RFID writer-reader 500 is configured such that the processor 510 causes the RFID writer reader 500 to determine a setpoint value for a reception parameter of at least one specimen RFID data carrier to be selected during a training phase.

The RFID writer-reader 500 relates actual values of reception parameters of detected RFID data carriers (TR1, TR2, TR3) to the setpoint value for the selection of the RFID data carrier from the detected RFID data carriers (TR1, TR2, TR3) during productive operation. The RFID writer-reader 500 performs detections of the at least one specimen RFID data carrier (TR1) during the training phase in a first temporal sequence, where at least one sequence of setpoint values for at least one reception parameter is determined as a temporal profile curve.

In addition, the RFID writer-reader 500 performs detections of RFID data carriers (TR1, TR2, TR3) situated in a reception region of the RFID writer reader 500 during productive operation in a second temporal sequence, where for each of the RFID data carriers (TR1, TR2, TR3) detected here a sequence of actual values is determined as a temporal profile curve.

The RFID writer-reader 500 also compares each sequence of the sequences of actual values determined in productive operation with the at least one sequence of setpoint values, where one of the RFID data carriers (TR1, TR2, TR3) detected in productive operation is selected based on a respective degree of correspondence.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for selecting a radio frequency identification data (RFID) carrier from a plurality of radio frequency identification data carriers detected by an RFID writer-reader, the method comprising:
   determining a setpoint value for a reception parameter of at least one specimen RFID data carrier to be selected during a training phase;
   relating actual values of reception parameters of detected RFID data carriers to the setpoint value for selecting the RFID data carrier from the detected RFID data carriers during productive operation;
   performing detections of the at least one specimen RFID data carrier during the training phase in a first temporal sequence, at least one sequence of setpoint values for at least one reception parameter comprising a temporal profile curve based on a received signal strength indication (RSSI) value of the detected RFID data carriers;
   performing detections of RFID data carriers situated in a reception region of the RFID writer-reader during productive operation in a second temporal sequence, a sequence of actual values comprising a temporal profile curve based on the RSSI value for each of the detected RFID data carriers; and comparing each sequence of the sequences of actual values determined in productive operation with the at least one sequence of setpoint values, the RFID data carrier of the RFID data carriers detected in productive operation being selected based on a respective degree of correspondence.

2. The method as claimed in claim 1, wherein the reception parameter further comprises a signal-to-noise ratio of a radio-frequency signal of a respective RFID data carrier, said radio-frequency signal being detected by the RFID writer-reader.

3. The method as claimed in claim 1, wherein the reception parameter further comprises a phase angle between a transmitted signal and a received signal of a radio-frequency signal of a respective RFID data carrier, said transmitted signal and received signal each being detected by the RFID writer-reader.

4. The method as claimed in claim 2, wherein the reception parameter further comprises a phase angle between a transmitted signal and a received signal of a radio-frequency signal of the respective RFID data carrier, said transmitted signal and received signal each being detected by the RFID writer-reader.

5. The method as claimed in claim 1, wherein a transmission power of the RFID writer-reader is varied in each case as a variation during the temporal sequence.

6. The method as claimed in claim 1, wherein a distance between a respective RFID data carrier and the RFID writer-reader is varied in each case as a variation during the temporal sequence.

7. The method as claimed in claim 1, wherein switching between at least one of (i) a plurality of antennas and (ii) antenna polarizations of the RFID writer-reader is performed as a variation during the temporal sequence.

8. The method as claimed in claim 1, wherein changes between a plurality of radio channels of the RFID writer-reader is performed as a variation during the temporal sequence.

9. The method as claimed in claim 5, wherein the variation during the temporal sequence is performed in an analogous manner in each case during the training phase and during productive operation.

10. The method as claimed in claim 1, further comprising:
detecting a plurality of sequences of setpoint values during the training phase are detected,
selecting at least one sequence of said detected plurality of sequences as a sequence of setpoint values to be used one of (i) manually by a user and (ii) automatically based on information obtained from content of a data memory of a respective RFID data carrier.

11. The method as claimed in patent claim 10, wherein the plurality of sequences of setpoint values result from detection of different RFID data carriers.

12. The method as claimed in claim 1, wherein upon quasi-simultaneous reception of the plurality of RFID data carriers, each of the plurality of RFID data carriers are distinguished from one another based on a respectively unique identifier or identification number, and wherein said identifier or an alias for said identifier is assigned in each case to at least one of (i) different sequences of setpoint values and (ii) actual values.

13. The method as claimed in claim 12, wherein for comparison of the sequences of setpoint values and actual values, characteristic variables are ascertained in each case from said sequences setpoint values, and wherein a decision about selection or non-selection of the RFID data carrier of the RFID data carriers corresponding to the sequences of setpoint values is made based on a degree of correspondence of the characteristic variables.

14. The method as claimed in patent claim 13, wherein a Fourier transformation is used to ascertain the characteristic variables.

15. An RFID writer-reader for selecting an RFID data carrier from a plurality of detected RFID data carriers, the RFID writer-reader including a processor and memory;
wherein the RFID writer-reader is configured such that the processor causes the RFID writer-reader to determine a setpoint value for a reception parameter of at least one specimen RFID data carrier to be selected during a training phase;
wherein actual values of reception parameters of detected RFID data carriers are related to the setpoint value for the selection of the RFID data carrier from the detected RFID data carriers during productive operation;
wherein detections of the at least one specimen RFID data carrier are performed during the training phase in a first temporal sequence, at least one sequence of setpoint values for at least one reception parameter comprising a temporal profile curve based on a received signal strength indication (RSSI) value of the detected RFID data carriers;
wherein detections of RFID data carriers situated in a reception region of the RFID writer-reader are performed during productive operation in a second temporal sequence, for each of the RFID data carriers detected a sequence of actual values comprising a temporal profile curve based on the RSSI value of the detected RFID data carriers; and
wherein each sequence of the sequences of actual values determined in productive operation are compared with the at least one sequence of setpoint values, one of the RFID data carriers detected in productive operation being selected based on a respective degree of correspondence.

16. A method for selecting a radio frequency identification data (RFID) carrier from a plurality of radio frequency identification data carriers detected by an RFID writer-reader, the method comprising:
determining a setpoint value for a reception parameter of at least one specimen RFID data carrier to be selected during a training phase;
relating actual values of reception parameters of detected RFID data carriers to the setpoint value for selecting the RFID data carrier from the detected RFID data carriers during productive operation;
performing detections of the at least one specimen RFID data carrier during the training phase in a first temporal sequence, at least one sequence of setpoint values for at least one reception parameter comprising a temporal profile curve based on a received signal strength indication (RSSI) value of the detected RFID data carriers;
performing detections of RFID data carriers situated in a reception region of the RFID writer-reader during productive operation in a second temporal sequence, a sequence of actual values comprising a temporal profile curve based on the RSSI value for each of the detected RFID data carriers; and
comparing each sequence of the sequences of actual values determined in productive operation with the at least one sequence of setpoint values, the RFID data carrier of the RFID data carriers detected in productive operation being selected based on a respective degree of correspondence.

\* \* \* \* \*